(12) United States Patent
Tillitski

(10) Patent No.: US 7,854,044 B1
(45) Date of Patent: Dec. 21, 2010

(54) MULTI-STRAND CABLE ATTACHMENT HUB

(76) Inventor: Stephan W. Tillitski, 180 Cypress Manor La., Athens, GA (US) 30606

( * ) Notice: Subject to any disclaimer, the term of this patent is extended or adjusted under 35 U.S.C. 154(b) by 574 days.

(21) Appl. No.: 11/977,093

(22) Filed: Oct. 24, 2007

(51) Int. Cl.
*F16G 11/05* (2006.01)
(52) U.S. Cl. .................................... 24/122.6
(58) Field of Classification Search ........... None
See application file for complete search history.

(56) References Cited

U.S. PATENT DOCUMENTS

| | | | | | |
|---|---|---|---|---|---|
| 1,758,312 | A | * | 5/1930 | De Right | 403/275 |
| 4,326,354 | A | * | 4/1982 | Hagberg | 446/126 |
| 4,557,007 | A | * | 12/1985 | Daiguji et al. | 14/22 |
| 6,560,939 | B2 | * | 5/2003 | Sorkin | 52/223.13 |

* cited by examiner

*Primary Examiner*—Jack W. Lavinder
(74) *Attorney, Agent, or Firm*—Rodgers & Rodgers

(57) ABSTRACT

A multi-strand cable attachment hub securing multiple trees or multiple poles together includes a hub base made of aluminum or another suitable soft metal with respectively angled tapered channels extending therethrough with tapered inner bodies made of stainless steel or other suitable hard metal with a central aperture extending therethrough. Multi-strand steel cables extending respectively through the channels and the ends partially unwound with a single strand threaded through the central apertures in the tapered inner bodies and the remaining strands threaded between the inner bodies and channel walk. The single middle strands are bent over the ends of the tapered inner bodies and the inner bodies pulled into the corresponding channel to trap the strands between each inner body and the wall of the channel.

9 Claims, 3 Drawing Sheets

MULTI-STRAND CABLE ATTACHMENT HUB

BACKGROUND OF THE INVENTION

In the field of rigging, it is often necessary to secure one pole to another, to secure one part of a tree to the remainder of the tree or to simply secure a tree against falling over. In order to provide this structural support for these operations, one end of a multi-strand cable is attached to the tree or pole to be supported and the other end of the cable is attached to another object. However, the mechanics of attaching the cable to a tree or pole presents certain technical difficulties in the field. There are also instances when it is desirable or necessary to secure three to five poles or trees together. This invention is designed to address these situations.

Steel cables are used to support trees, power poles and similar items. Such cables are typically attached to three poles or trees by what is commonly known as a "hub and spoke" system. This system is typically comprised of a forged steel ring in the center, surrounded by terminal hardware that might include pre-formed wraps and thimbles or, alternatively, a steel ring in the center connected by terminal hardware called "strand vises." The system requires multiple parts, is comparatively large when installed and is given to failure because of constant metal-to-metal wear inherent in the system. These attachment techniques also tend to be difficult to use in close quarters, such as when the trunks of a tree are closer together than approximately three feet.

Accordingly, a need remains in the art for a device for conveniently attaching steel cable to multiple trees and poles. Such a device must be strong, easily used in the field, compact and involve few parts.

BRIEF SUMMARY OF THE INVENTION

The multi-strand cable attachment hub is intended for use with multi-strand steel cables for securing multiple trees and/or poles together for support, or to hang street lights, signs and the like. The hub comprises an outside block of metal machined such that three tapered channels are spaced at 120 degrees or, alternately, five holes spaced at 72 degrees, depending on the number of trees/poles that need to be supported. In addition, the holes are offset sufficiently and respectively angled and respectively angled so that the cables do not intersect at the center of the hub. Tapered inner bodies are machined to fit inside the block's tapered holes thereby securing the multi-strand steel cable between the inner body and the periphery of the channel with a single middle strand of the multi-strand cable bent over to fix the inner body onto the multi-strand steel cable.

DETAILED DESCRIPTION OF THE INVENTION

The present invention is understood more readily by reference to the following detailed description, taken in connection with the accompanying drawing figures, which form a part of this disclosure. It is understood that this invention is not limited to the specific metals, devices, methods, conditions, or parameters described and/or shown herein and that the terminology is for the purpose of describing particular embodiments by way of example only and is not intended to be limiting of the claimed invention. Moreover, while the invention is described in connection with the use of multi-strand steel cable, it is recognized that the invention is not limited to such use and that it is equally applicable to other types of cable, wire and the like.

Figure 1:
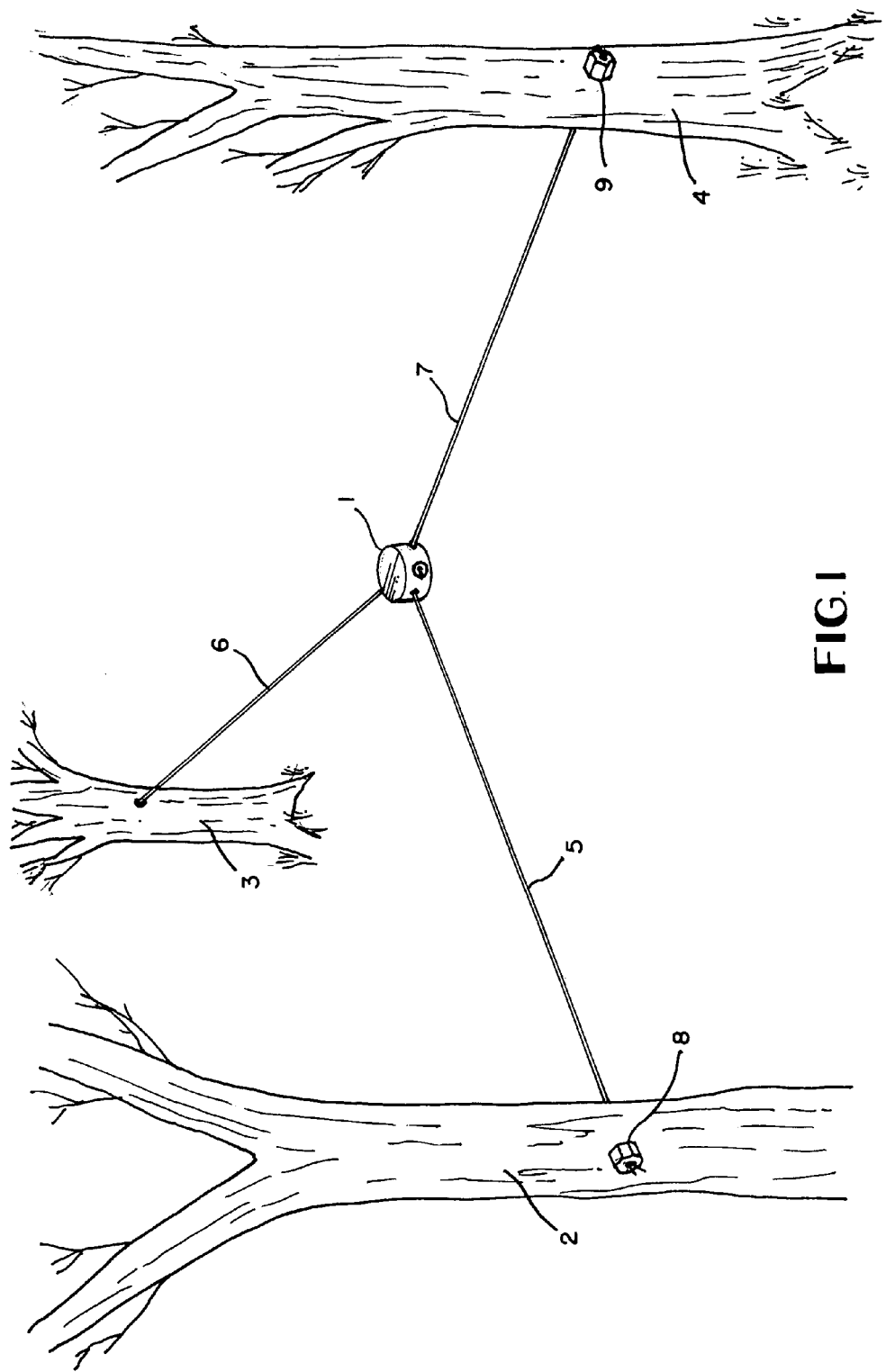
FIG. 1 is a perspective view of a multi-strand cable attachment hub interconnecting three trees.

With reference to the drawings and with particular reference to FIG. 1, the numeral 1 designates the hub base, according to this invention. Hub base 1 is interconnected to trees 2, 3 and 4 by means of multi-strand cables 5, 6 and 7, respectively. Each of the cables 5, 6 and 7 extends through a hole drilled in respective tree 2, 3 and 4 wherein the ends of the wires remote from hub base 1 are secured to the respective tree by means of cable termination devices 8 and 9 having inner and outer bodies nested together with multiple cable strands positioned therebetween as described in applicant's co-pending patent application Ser. No. 11/710,642. The cable termination device in connection with tree 3 is disposed behind the tree and therefore not shown in the drawings.

Figure 6:
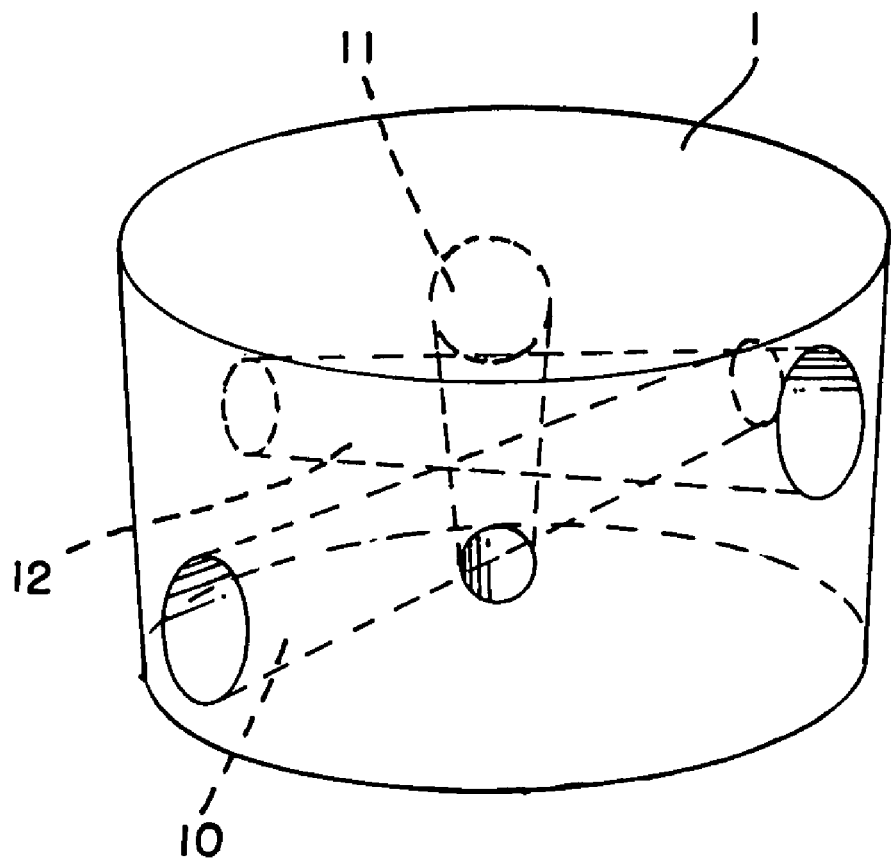
FIG. 6 is an enlarged perspective view of the hub with the interior channels shown in dotted lines.

Hub base 1, according to this invention and as best shown in FIG. 6, includes tapered channels 10, 11 and 12. Although tapered channels 10, 11 and 12 are shown in the drawings as being round, it is recognized that other shapes can be utilized, such as round, triangular, hexagonal, etc. Also, if it is desired to secure additional trees, it is simply necessary to add additional channels to hub base 1.

Figure 2:
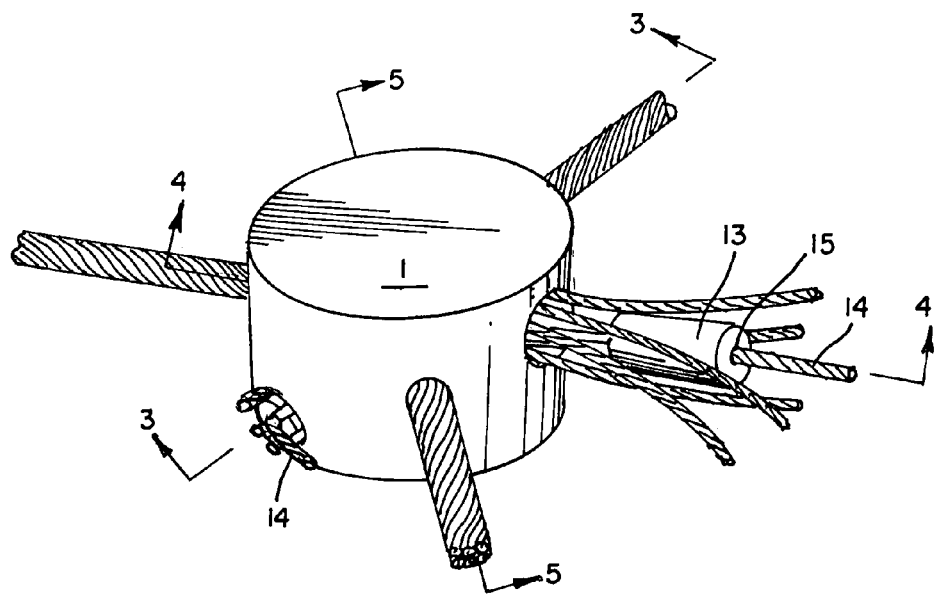
FIG. 2 is an enlarged perspective view of the hub with intersecting multi-cable wires.
Figure 3:
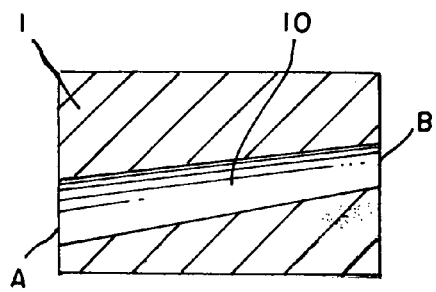
FIG. 3 is a cross-sectional view taken along the line 3-3 in FIG. 2.
Figure 4:
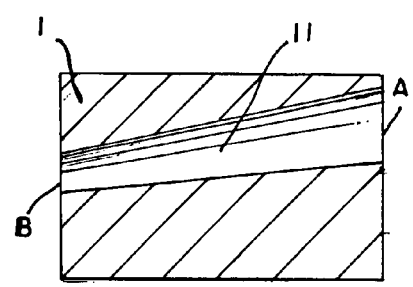
FIG. 4 is a cross-sectional view taken along the line 4-4 in FIG. 2.
Figure 5:
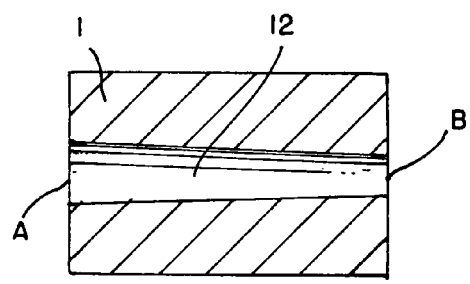
FIG. 5 is a cross-sectional view taken along the line 5-5 in FIG. 2.

Each of the tapered channels 10, 11 and 12 includes larger opening A and, oppositely disposed, smaller opening B, as clearly shown in FIGS. 3, 4 and 5. Once cables 5, 6 and 7 are respectively secured at the outer ends to trees 2, 3 and 4, the opposite ends thereof are threaded into the respective tapered channels 10, 11 and 12 by entering at smaller openings B and exiting at larger openings A. Then the multiple-strands of each cable are separated, as best shown in FIG. 2. Tapered inner body 13 is provided for each cable such that the inner strand 14 of each multi-strand cable 5, 6 and 7 is inserted through the respective aperture 15 formed in tapered inner body 13. The remaining strands are disposed between tapered inner body 13 and the surrounding portion of hub base 1. Then inner strand 14 is manually bent over the outer end of tapered inner body 13. Upon the application of tensile force on cables 5, 6 and 7, the strands of the multi-strand cables 5, 6 and 7 pull the respective tapered inner body 13 into the respective tapered channel 10, 11 and 12 to a point where the multiple strands are tightly captured between tapered inner body 13 and the adjacent wall of tapered channels 10, 11 and 12 as shown in connection with channel 10 in FIG. 2.

In order to avoid the problem of cables 5, 6 and 7 intersecting when inserted into hub base 1, and to maintain hub base 1 in a level or horizontal position, which is essentially parallel to the ground, middle channel 12 extends horizontally through hub base 1 whereby the axis thereof is parallel to the flat top and bottom surfaces of hub base 1. The larger exit opening A of lower channel 10 is positioned below the axis of channel 12 and angled upwardly so as to extend through hub base 1 under channel 12 with cable entry opening B positioned above channel 12. In a similar manner, upper channel 11 is angled downwardly extending above middle channel 12 such that cable entry opening B is positioned below channel 12 with cable exit opening A positioned above channel 12.

Preferably, hub base 1 is made of corrosion-resistant material such as aluminum with tapered inner bodies 13 made of stainless steel or other like material. While steel has high strength, the softer aluminum provides a very good hold while minimizing the tendency to cut or break the individual strands of the multi-strand steel cable. For the purpose of obtaining a secure initial hold and continuing to hold at the highest possible pressures, inner body 13 is made of a material harder than that of hub base 1.

The invention claimed is:

1. A cable attachment hub comprising a hub base, said hub base having parallel planar upper and lower surfaces, at least three spaced channels extending through said hub base between said surfaces, said channels comprising entry and exit openings, said channels being tapered, said entry openings being smaller in diameter than said exit openings, said channels being respectively angularly disposed, the one axis of one of said channels being disposed generally parallel to said surfaces, the axes of the others of said channels being respectively angularly disposed with respect to said one axis, the entry opening of the second of said channels being disposed below said one axis, the exit opening of said second channel being disposed above said one axis, the entry opening of the third of said channels being deposed above said one axis, and the exit opening of said third channel being disclosed below said one axis.

2. A hub according to claim 1 wherein multi-strand cables extend respectively through said channels.

3. A hub according to claim 2 wherein inner bodies are disposed in said channels respectively adjacent said exit openings.

4. A hub according to claim 3 wherein apertures are formed respectively in said inner bodies.

5. A hub according to claim 4 wherein said inner bodies are tapered.

6. A hub according to claim 5 wherein said channels include outer walls.

7. A hub according to claim 6 wherein one central cable strand extends through each of said apertures and the remaining cable strands are disposed respectively between said inner bodies and the adjacent portions of said outer walls.

8. A hub according to claim 3 wherein said hub base and said inner bodies are made of metal and the metal of said hub base is less hard than the metal of said inner bodies.

9. A hub according to claim 8 wherein said hub base is aluminum and said inner bodies are stainless steel.

* * * * *